(12) United States Patent
Liu et al.

(10) Patent No.: US 8,599,527 B2
(45) Date of Patent: Dec. 3, 2013

(54) OVERVOLTAGE PROTECTION CIRCUIT AND PORTABLE ELECTRONIC DEVICE HAVING THE SAME

(75) Inventors: Wei-Jen Liu, Taipei (TW); Ching-Feng Hsieh, Taipei (TW)

(73) Assignees: Askey Technology (Jiangsu) Ltd. (CN); Askey Computer Corp. (TW)

( * ) Notice: Subject to any disclaimer, the term of this patent is extended or adjusted under 35 U.S.C. 154(b) by 33 days.

(21) Appl. No.: 13/289,058

(22) Filed: Nov. 4, 2011

(65) Prior Publication Data

US 2013/0063849 A1 Mar. 14, 2013

(30) Foreign Application Priority Data

Sep. 9, 2011 (TW) ............................... 100132753 A

(51) Int. Cl.
*H02H 3/22* (2006.01)
(52) U.S. Cl.
USPC .......................................... 361/91.1; 361/111
(58) Field of Classification Search
USPC .................................... 361/91.1, 91.2, 56, 111
See application file for complete search history.

(56) References Cited

U.S. PATENT DOCUMENTS

| | | | | |
|---|---|---|---|---|
| 5,914,542 | A * | 6/1999 | Weimer et al. | 307/125 |
| 8,068,322 | B2 * | 11/2011 | Bingel et al. | 361/93.1 |
| 2004/0150929 | A1 * | 8/2004 | Strayer et al. | 361/91.1 |
| 2009/0091872 | A1 * | 4/2009 | Ueda | 361/91.1 |

* cited by examiner

*Primary Examiner* — Danny Nguyen
(74) *Attorney, Agent, or Firm* — Schmeiser, Olsen & Watts, LLP

(57) ABSTRACT

An overvoltage protection circuit and a portable electronic device having the same are introduced. The overvoltage protection circuit provides overvoltage protection when an input voltage exceeds a rated voltage tolerable by an internal circuit unit in the portable electronic device. A reference voltage and a partial voltage are generated from the input voltage through a voltage limiting unit and voltage dividing module, respectively, and conveyed to a comparing module for comparison. Comparison of the reference voltage and the partial voltage is followed by generation of a switch signal whereby a switch unit determines whether to apply the input voltage to the internal circuit unit. The voltage dividing module sets the maximum rated voltage tolerable by the internal circuit unit and enables the overvoltage protection circuit to give overvoltage protection to the portable electronic device regardless of temperature.

11 Claims, 8 Drawing Sheets

OVERVOLTAGE PROTECTION CIRCUIT AND PORTABLE ELECTRONIC DEVICE HAVING THE SAME

CROSS-REFERENCE TO RELATED APPLICATION

This non-provisional application claims priority under 35 U.S.C. §119(a) on Patent Application No(s). 100132753 filed in Taiwan, R.O.C. on Sep. 9, 2011, the entire contents of which are hereby incorporated by reference.

FIELD OF TECHNOLOGY

The present invention relates to an overvoltage protection circuit, in particular to the overvoltage protection circuit that provides a protection to an internal circuit unit of a portable electronic device if the voltage of the internal circuit unit exceeds a rated voltage tolerable.

BACKGROUND

In general, a conventional portable electronic device receives an external input voltage through an adapter, and the adaptor is used for supplying an input voltage to the portable electronic device.

As the number of a user's portable electronic devices increases, the number of various types of adapters also increases. These adapters generally come with different electric properties including different rated input/output voltages, and a misuse of an adapter by accident may damage the portable electronic device directly. For example, a portable electronic device includes an internal circuit unit such as a battery, an electronic component and an electronic circuit, and the internal circuit unit has a maximum rated voltage equal to 12 volts. If the user uses an adapter with a voltage higher than 12 volts to supply electric power to the portable electronic device, then the battery, electronic component and electronic circuit of the portable electronic device may be damaged by the high voltage and may fail to operate.

Therefore, the present invention provides an overvoltage protection circuit to overcome the aforementioned drawbacks of the prior art.

SUMMARY

It is a primary objective of the present invention to provide an overvoltage protection circuit to protect an internal circuit unit of a portable electronic device, and prevent the internal circuit unit from receiving an input voltage exceeding a rated voltage tolerable of the internal circuit unit.

Another objective of the present invention is to provide an overvoltage protection circuit for isolating the input voltage exceeding the rated voltage to be inputted to the internal circuit units, while the protection is not affected by a change of temperature.

A further objective of the present invention is to provide an overvoltage protection circuit for setting the rated voltage tolerable of the portable electronic device through a program by the voltage dividing module.

To achieve the aforementioned and other objectives, the present invention provides an overvoltage protection circuit for providing an overvoltage protection when an input voltage exceeds a rated voltage tolerable of an internal circuit unit in a portable electronic device. The overvoltage protection circuit comprises an input unit, an output unit, a voltage limiting unit, a voltage dividing module, a comparing module and a switch unit. The input unit is provided for receiving the input voltage; the output unit is provided for coupling the portable electronic device; the voltage limiting unit is coupled to the input unit for receiving the input voltage and restrictively outputting a reference voltage; the voltage dividing module is coupled to the input unit for receiving the input voltage and dividing the input voltage to produce a partial voltage; the comparing module is coupled to the voltage limiting unit and the voltage dividing module for comparing the reference voltage with the partial voltage and generating a switch signal according to a comparison result; and the switch unit is coupled to the input unit, the output unit and the comparing module, for receiving the switch signal and the input voltage, wherein the switch signal is used for controlling the input voltage to be sent to the output unit through the voltage dividing module.

Compared with the prior art, the overvoltage protection circuit of the present invention can set the rated voltage tolerable for the internal circuit unit of the portable electronic device simply and easily through the voltage dividing module and operates together with the voltage limiting unit, while the operation is not affected by a change of temperature easily, so as to achieve the effects of supplying an input voltage lower than the rated voltage to the portable electronic device successfully, as well as precisely controlling and isolating the input voltage to be inputted to the portable electronic device before an input voltage exceeding the rated voltage (or known as an over voltage) is inputted, so as to prevent the internal circuit units of the portable electronic device from being damaged by the input voltage exceeding the rated voltage, and protect the internal circuit units of the portable electronic device from being damaged by a misuse of the input voltage.

BRIEF DESCRIPTION

DETAILED DESCRIPTION

The objects, characteristics and effects of the present invention will become apparent with the detailed description of the preferred embodiments and the illustration of related drawings as follows.

Figure 1:
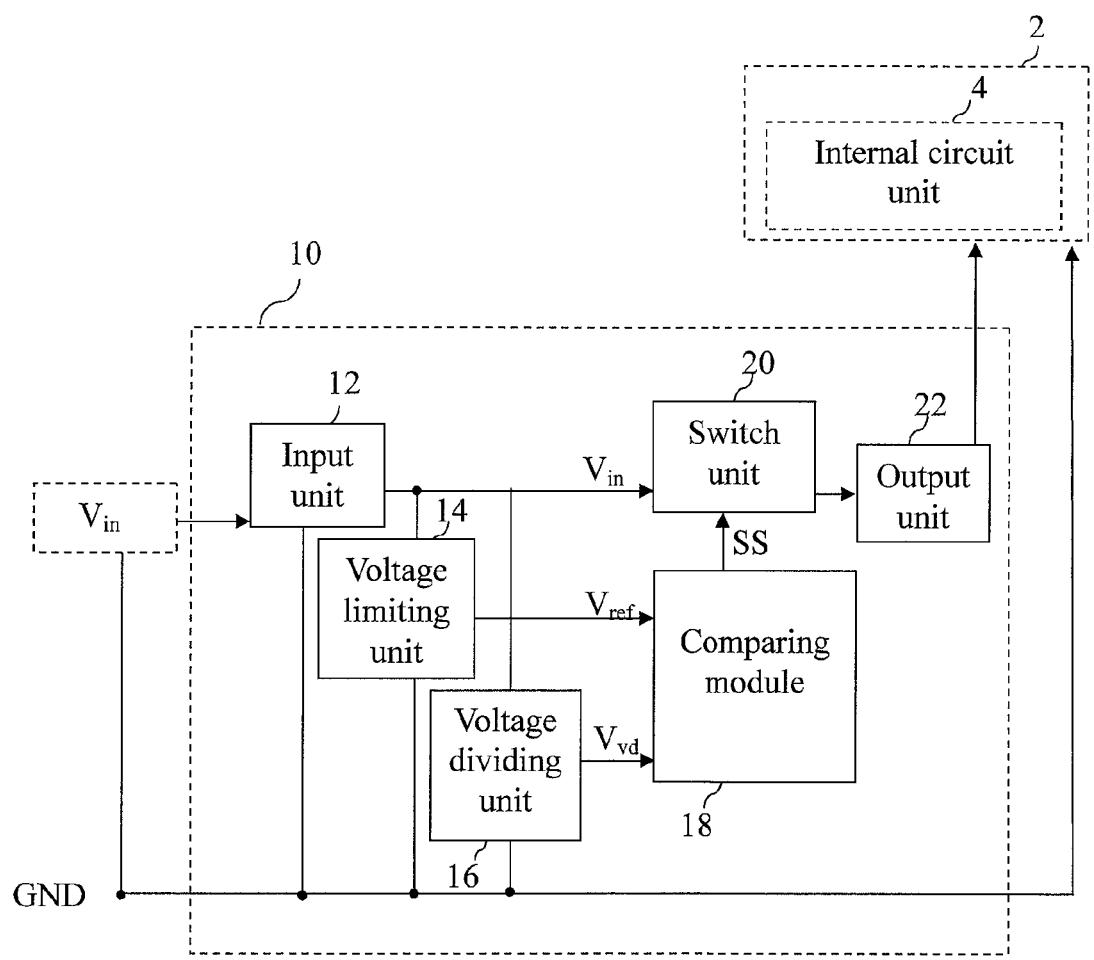
FIG. 1 is a schematic block diagram of an overvoltage protection circuit in accordance with a first preferred embodiment of the present invention.

With reference to FIG. 1 for a schematic block diagram of an overvoltage protection circuit in accordance with the first preferred embodiment of the present invention, the overvoltage protection circuit 10 is installed between an input voltage $V_{in}$ and a portable electronic device 2, for performing an overvoltage protection (OVP). The internal circuit unit 4 of the portable electronic device 2 is configured with a maximum input voltage tolerable which is also called a rated voltage. Therefore, the overvoltage protection circuit can be used for preventing the input voltage $V_{in}$ exceeding the rated voltage from being inputted to the portable electronic device 2 directly or resulting in damages to the internal circuit unit 4.

In addition, the rated voltage is further defined as the maximum operating voltage tolerable of the internal circuit unit 4 of the portable electronic device 2. In other words, if the input voltage $V_{in}$ received by the portable electronic device 2 does not exceed the rated voltage, the internal circuit unit such as a rectifier circuit, a charge/discharge circuit or a display circuit of the portable electronic device 2 can be operated normally. On the other hand, if the input voltage $V_{in}$ received by the portable electronic device 2 exceeds the rated voltage, the portable electronic device 2 will damage the internal circuit unit, and the portable electronic device 2 may perform wrong operations or may even fail. In addition, the input voltage $V_{in}$ can be an AC voltage obtained from utility power or a rectified DC voltage.

The overvoltage protection circuit 10 comprises an input unit 12, a voltage limiting unit 14, a voltage dividing module 16, a comparing module 18, a switch unit 20 and an output unit 22. Wherein, the input unit 12 is provided for receiving the input voltage $V_{in}$, and the input voltage $V_{in}$ can be a DC voltage or an AC voltage.

The voltage limiting unit 14 has two terminals, wherein one terminal is coupled to the input unit 12, and the other terminal is coupled to a ground terminal GND. The input voltage $V_{in}$ produces a corresponding reference voltage $V_{ref}$ through the voltage limiting unit 14. Wherein, the voltage limiting unit 14 is a two-terminal device with a temperature change resisting effect, so that the electric properties of the voltage limiting unit 14 such as a Zener diode will not be affected by a change of temperature. In addition, the voltage limiting unit 14 has a default clamping voltage PV provided for the voltage limiting unit 14 to determine whether or not to be conducted according to the received input voltage $V_{in}$.

In other words, if the input voltage $V_{in}$ is applied to the voltage limiting unit 14, and the input voltage $V_{in}$ is smaller than or equal to the clamping voltage PV, then the voltage limiting unit 14 will output the reference voltage $V_{ref}$ equal to zero voltage (which represents an OFF state); on the other hand, if the input voltage $V_{in}$ is greater than the clamping voltage PV, the voltage limiting unit 14 will output the reference voltage $V_{ref}$ equal to the clamping voltage PV (which represents an ON state).

The aforementioned OFF state is defined as a state of disconnecting the voltage limiting unit 14, and the reference voltage $V_{ref}$ is equal to a zero potential; and the aforementioned ON state is defined as a state of the voltage limiting unit 14 constantly outputting the clamping voltage PV, or the reference voltage $V_{ref}$ is equal to the clamping voltage PV. In addition, the selection of the clamping voltage PV of the voltage limiting unit 14 is not related to the rated voltage of the portable electronic device 2.

Figure 2:
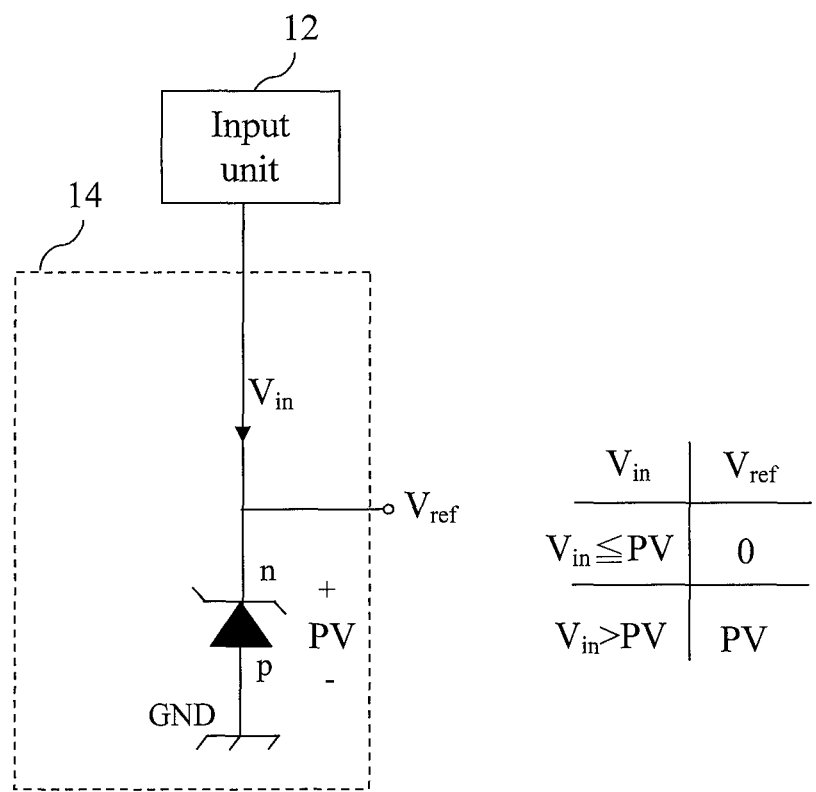
FIG. 2 is a schematic diagram of the voltage limiting unit as depicted in FIG. 1.

With reference to FIG. 2, the Zener diode is used as an example of the voltage limiting unit 14 to illustrate the invention. If the default clamping voltage PV of the Zener diode is designed to be equal to 4 volts, and the input voltage $V_{in}$ applied to the two terminals of the Zener diode is smaller than 4 volts, the reference voltage $V_{ref}$ will be a zero potential; and if the input voltage $V_{in}$ applied to the two terminals of the Zener diode is greater than 4 volts, the reference voltage $V_{ref}$ is equal to the clamping voltage PV. In other words, the output of the reference voltage $V_{ref}$ is equal to 4 volts. Compared with a general diode, the Zener diode is connected in a reverse direction, wherein an n-terminal of the Zener diode is coupled to the input unit 12, and a p-terminal of the Zener diode is coupled to the ground terminal GND.

Figure 3:
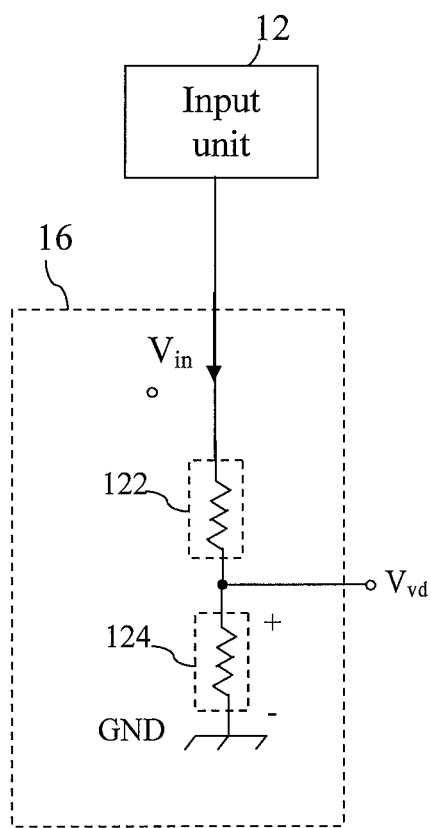
FIG. 3 is a schematic diagram of the voltage dividing module as depicted in FIG. 1.

The voltage dividing module 16 is coupled to the input unit 12, and the input voltage $V_{in}$ of the input unit 12 produces a partial voltage $V_{vd}$ through the voltage dividing module 12. In a preferred embodiment, the voltage dividing module 16 includes a first resistor 122 and a second resistor 124 connected in series with each other, and the input voltage $V_{in}$ produces the partial voltage $V_{vd}$ at the second resistor 124 as shown in FIG. 3. In addition, the ratio of the resistance of the first resistor 122 to the resistance of the second resistor 124 can be adjusted to obtain a partial voltage $V_{vd}$ with a corresponding resistance ratio, and the relation between the partial voltage and the resistance ratio is given below:

$$V_{vd} = \frac{R_{124}}{R_{124} + R_{122}} \times V_{in}$$

Wherein, $R_{122}$ is the resistance of the first resistor 122, and $R_{124}$ is the resistance of the second resistor 124.

In addition, the voltage dividing module 16 is used for setting the rated voltage by the resistance ratio of the first resistor 122 and the second resistor 124 to meet the voltage requirement of the portable electronic device. In other words, if the partial voltage $V_{vd}$ of the second resistor 124 is greater than or equal to (which is not smaller than) the reference voltage $V_{ref}$, the following switch unit 20 is open circuited (or the OFF state). In other words, the input voltage $V_{in}$ cannot be transmitted to the internal circuit unit 4, and details are described as follows.

The comparing module 18 is coupled to the voltage limiting unit 14 and the voltage dividing module 16, and the comparing module 18 compares the reference voltage $V_{ref}$ with the partial voltage $V_{vd}$ and uses a comparison result to output the corresponding switch signal SS.

Figure 4:
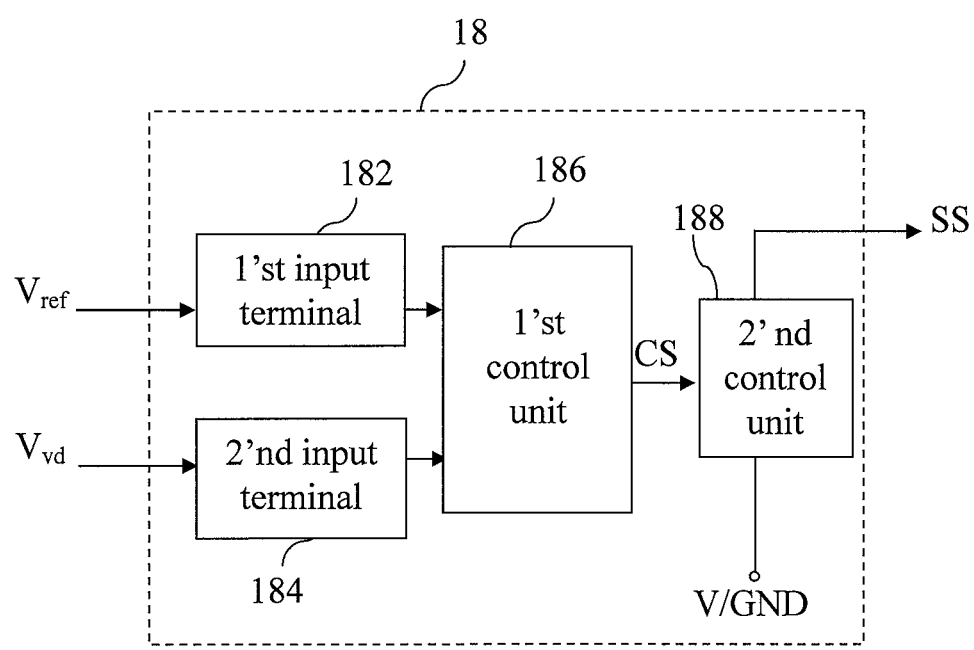
FIG. 4 is a schematic diagram of the comparing module as depicted in FIG. 1.

With reference to FIG. 4 for a schematic view of the comparing module 18, the comparing module 18 further comprises a first input terminal 182, a second input terminal 184, a first control unit 186 and a second control unit 188. The first input terminal 182 is coupled to the voltage limiting unit 14 for receiving the reference voltage $V_{ref}$; and the second input terminal 184 is coupled to the voltage dividing module 16 for receiving the partial voltage $V_{vd}$. The first control unit 186 is provided for receiving the reference voltage $V_{ref}$ and the partial voltage $V_{vd}$. After the reference voltage $V_{ref}$ is compared with the partial voltage $V_{vd}$, the control signal CS is generated and transmitted to the second control unit 184, such that the control signal CS can control open-circuit and short-circuit conditions of the second control terminal 188.

For example, if the rated voltage of the internal circuit unit 4 is equal to 4 volts, the clamping voltage PV is also equal to 4 volts, and the first resistor 122 has a resistance of 90KΩ and the second resistor 124 has a resistance of 10KΩ. If the input voltage $V_{in}$ (such as 3 volts) is lower than the rated voltage, the voltage limiting unit 14 has the reference voltage $V_{ref}$ equal to an output voltage of 0, and the partial voltage $V_{vd}$ is equal to 0.3 volts. The comparing module 18 compares the reference voltage $V_{ref}$ with the partial voltage $V_{vd}$ to obtain a comparison result that the partial voltage $V_{vd}$ is higher than the reference voltage $V_{ref}$. Since the input voltage $V_{in}$ is not higher than the rated voltage, therefore the comparing module 18 can control the switch unit 20 to output the input voltage Vin to the output unit 22.

In another preferred embodiment, if the input voltage $V_{in}$ is equal to the rated voltage such as 4 volts, the voltage limiting unit 14 has the reference voltage $V_{ref}$ equal to the output voltage of 0, and the partial voltage $V_{vd}$ is equal to 0.4 volts. The comparing module 18 compares the reference voltage $V_{ref}$ with the partial voltage $V_{vd}$ to obtain the same comparison result that the partial voltage $V_{vd}$ is higher than the reference voltage $V_{ref}$. Since the input voltage $V_{in}$ is equal to the rated voltage which still falls within the tolerable range of the internal circuit unit 4, therefore the comparing module 18 can control the switch unit 20 to output the input voltage $V_{in}$ to the output unit 22 and supply the input voltage $V_{in}$ to the internal circuit unit 4.

In another preferred embodiment, if the input voltage Vin exceeds the rated voltage such as 5 volts, the voltage limiting unit 14 outputs a constant voltage which is the clamping voltage PV equal to 4 volts as the reference voltage $V_{ref}$, and the partial voltage $V_{vd}$ is equal to 0.5 volts. The comparing module 18 compares the reference voltage $V_{ref}$ with the partial voltage $V_{vd}$ to obtain a comparison result that the partial voltage $V_{vd}$ is lower than the reference voltage $V_{ref}$. Since the input voltage $V_{in}$ exceeds the tolerable range of the rated voltage of the internal circuit unit 4, therefore the comparing module 18 controls the switch unit 20 according to the aforementioned comparison result, such that the input voltage Vin cannot be supplied to the internal circuit unit 4.

In a preferred embodiment, the second control unit 188 is a three-terminal device, wherein one terminal is coupled to the first control unit 186 for receiving the control signal CS, the other terminal is coupled to the switch unit 20, and the remaining terminal is coupled to a voltage V or a ground GND. In other words, the control signal CS received by one terminal of the second control unit 188 can be used to form an open-circuit state or a short-circuit state of the other two terminals according to the control signal CS used in the two terminals. Wherein, the second control unit 188 is a metal oxide semiconductor field effect transistor (MOSFET).

Figure 5:
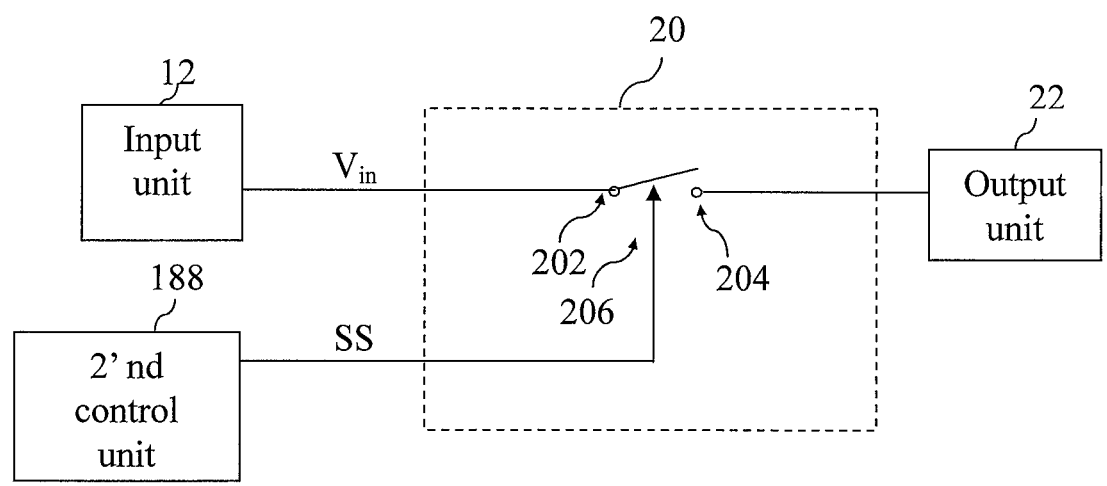
FIG. 5 is a schematic diagram of the switch unit as depicted in FIG. 1.

In FIG. 1, the switch unit 20 is coupled to the input unit 12, the comparing module 18 and the output unit 22, and the switch unit 20 drives the input unit 12 to be coupled to the portable electronic device 4 according to the switch signal SS. In a preferred embodiment as shown in FIG. 5, the switch unit 20 is a three-terminal device having an input terminal 202, an output terminal 204 and a controlled terminal 206, wherein the input terminal 202 is coupled to the input unit 12, and the controlled terminal 206 is coupled to the second control unit 188, and the controlled terminal 206 is selectively coupled to the input terminal 202 and the output terminal 204 according to the received switch signal SS, so that the input unit 12 can be coupled to the output unit 22, and the input voltage Vin can be supplied to the portable electronic device 4 through the output unit 22. In a preferred embodiment, if the second control unit 188 is situated at a short-circuit state, the voltage V forms the switch signal SS directly by the switch terminal 188 and the switch signal SS is transmitted to the controlled terminal 206 to control the switch unit 20, or the second control unit 188 makes use of the ground GND and controls the switch unit 20 by using the switch signal SS through the controlled terminal 206. Wherein, the switch unit 20 is a metal oxide semiconductor field effect transistor (MOSFET).

Figure 6:
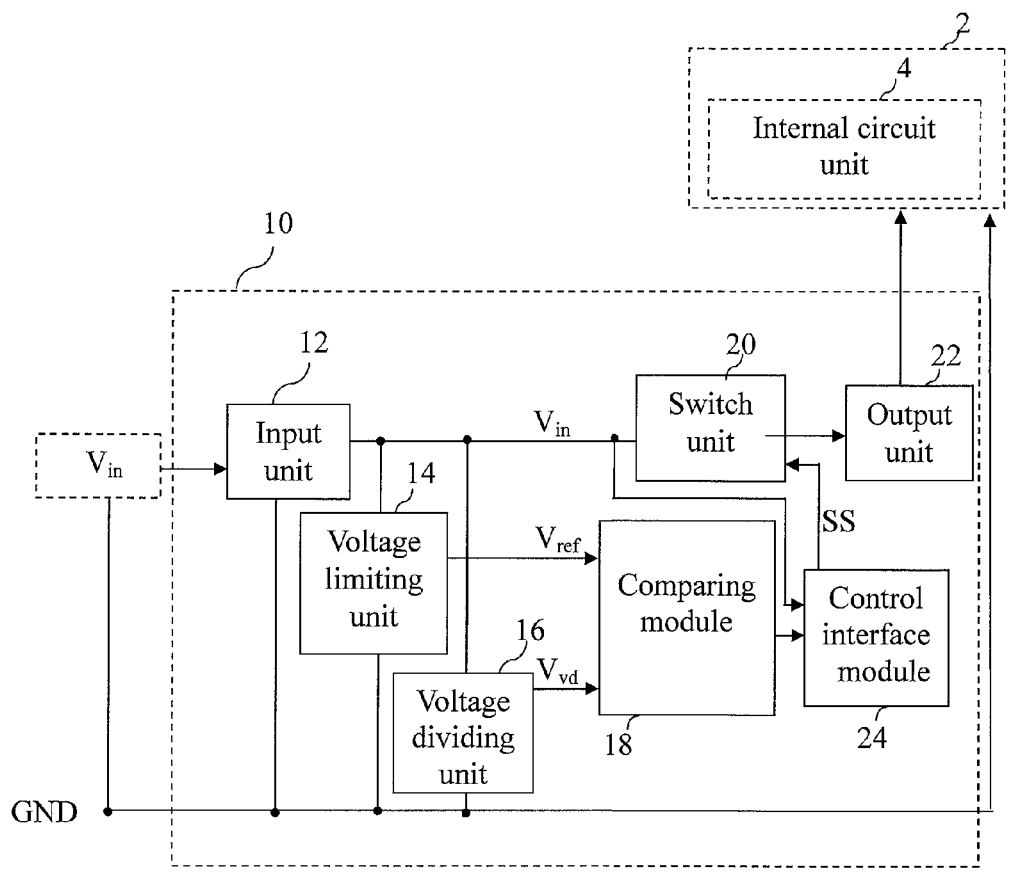
FIG. 6 is a schematic block diagram of an overvoltage protection circuit in accordance with a second preferred embodiment of the present invention.

With reference to FIG. 6 for a schematic block diagram of an overvoltage protection circuit in accordance with the second preferred embodiment of the present invention, the overvoltage protection circuit 10' further comprises a control interface module 24, in addition to the input unit 12, the voltage limiting unit 14, the voltage dividing module 16, the comparing module 18, the switch unit 20 and the output unit 22 of the foregoing preferred embodiment. Wherein, the control interface module 24 is coupled to the input unit 12, the comparing module 14 and the switch unit 20, and the comparing module 14 generates the corresponding switch signal SS through the control interface module 24.

Figure 7:
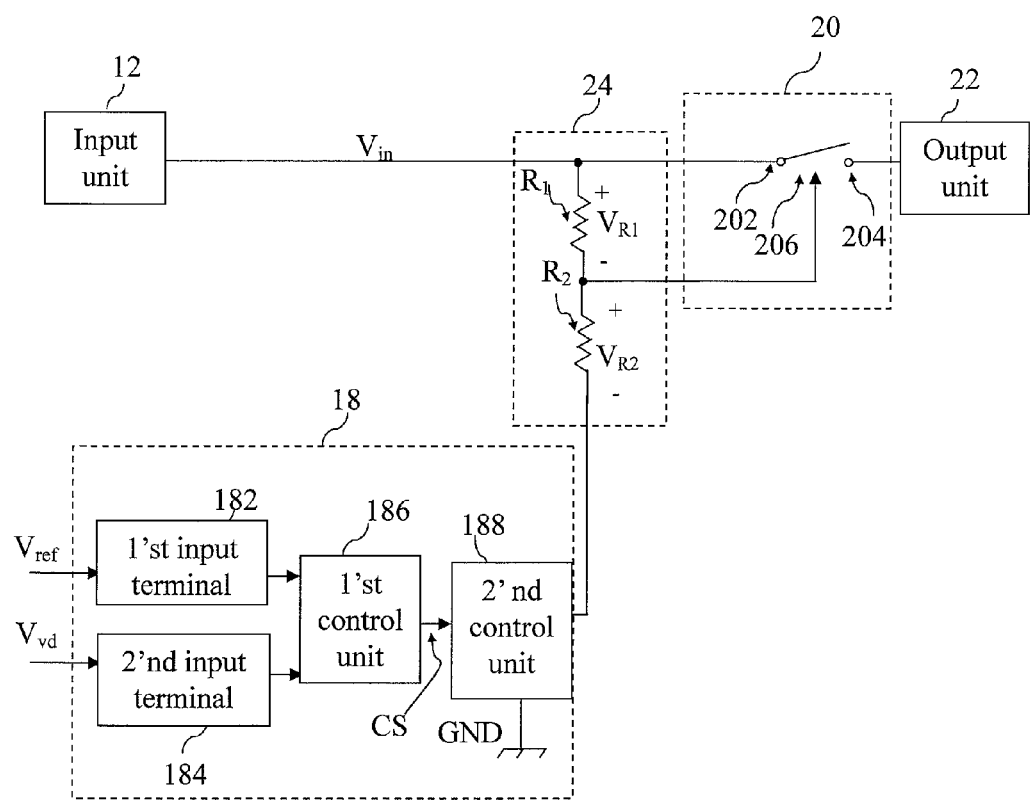
FIG. 7 is a schematic diagram of connecting the comparing module, the control interface module and the switch unit as depicted in FIG. 6.

With reference to FIG. 7 for a schematic diagram of connecting the comparing module 18, the control interface module 24 and the switch unit 20 as depicted in FIG. 6, the control interface module 24 is comprised of serial resistors R1, R2, and the input voltage $V_{in}$ of the input unit 12 generates the switch signal SS at a portion of the serial resistors R1, R2. The second control unit 188 of the comparing module 18 is a three-terminal device, wherein one terminal is coupled to the first control unit 186 for receiving the control signal CS, the other terminal is coupled to the control interface module 24, and the remaining terminal is coupled to the ground terminal GND.

If the control signal CS drives the second control unit 188 to a short-circuit state, the input voltage $V_{in}$ generates the switch signal SS through the serial resistors R1, R2 of the control interface module 24, the second control unit 188 coupled to the ground terminal GND, the voltage drops voltage $V_{R1}$, $V_{R2}$ of the serial resistors R1, R2, and the use of the voltage drop $V_{R2}$ of the serial resistors R2, and transmits the switch signal SS to the controlled terminal 206 to control the short circuit of the input terminal 202 and the output terminal 204, such that the input voltage $V_{in}$ can be supplied to the output unit 22. On the other hand, if the control signal CS drives the switch terminal 188 to an open-circuit state, the serial resistors R1, R2 do not form an electric circuit, so that the input voltage $V_{in}$ cannot form a voltage drops $V_{R1}$, $V_{R2}$ at the serial resistors R1, R2. In other words, the control interface module 24 cannot generate the switch signal SS for controlling the input terminal 202 and the output terminal 204 to be in the short-circuit state, and the input voltage $V_{in}$ cannot be supplied to the internal circuit unit 4 through the output unit 2.

Figure 8:
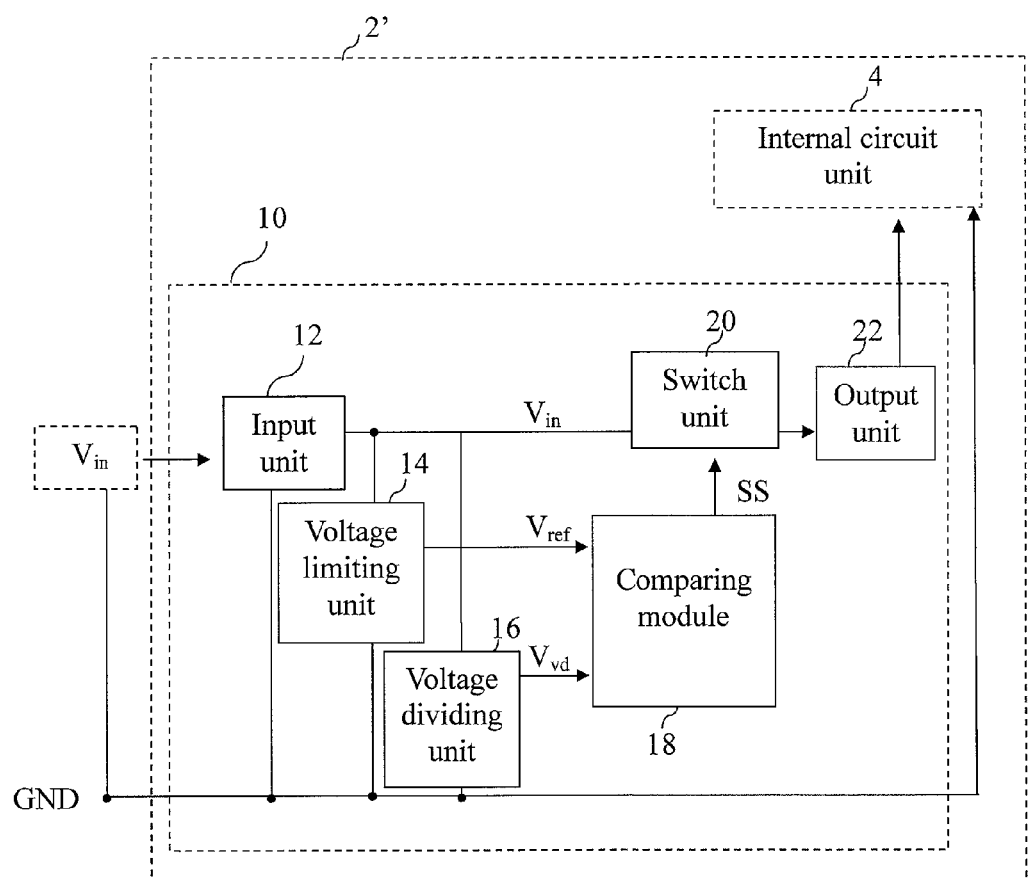
FIG. 8 is a schematic block diagram of a portable electronic device having an overvoltage protection circuit in accordance with a preferred embodiment of the present invention.

With reference to FIG. 8 for a schematic block diagram of an overvoltage protection circuit of a portable electronic device in accordance with a preferred embodiment of the present invention, the portable electronic device 2' is provided for receiving an input voltage $V_{in}$, and the portable electronic device 2' comprises the input unit 12, the voltage limiting unit 14, the voltage dividing module 16, the comparing module 18, the switch unit 20 and the output unit 22 of the foregoing preferred embodiment. Wherein, the internal circuit unit 4 is installed in the portable electronic device 2. For example, the internal circuit unit 4 is a circuit of a rectification unit, a micro processing unit, a communication unit or a memory unit. The input unit 12 is provided for receiving the input voltage $V_{in}$. The output unit 22 is coupled to the internal circuit unit 4 for outputting the input voltage $V_{in}$ to the internal circuit unit 4.

The voltage limiting unit 14 is coupled to the input unit 12 for receiving the input voltage $V_{in}$ and restrictively outputting a reference voltage $V_{ref}$. The voltage dividing module 16 is coupled to the input unit 12 for receiving the input voltage $V_{in}$ and dividing the input voltage $V_{in}$ to produce a partial voltage $V_{vd}$. The comparing module 16 is coupled to the voltage limiting unit 14 and the voltage dividing module 16 for comparing the reference voltage Vref with the partial voltage $V_{vd}$ and generating a switch signal SS according to a comparison result. The switch unit 20 is coupled to the input unit 12, the output unit 22 and the comparing module 18 for receiving the switch signal SS and the input voltage $V_{in}$, and the switch signal SS is used for controlling the input voltage $V_{in}$ to be outputted to the output unit 22 through the switch unit 20.

Therefore, the overvoltage protection circuit of the present invention can set the rated voltage tolerable for the internal circuit unit of the portable electronic device simply and easily through the voltage dividing module and operates together with voltage limiting unit while the operation is not affected by a change of temperature, so as to supply an input voltage lower than the rated voltage to the portable electronic device successfully, as well as precisely controlling and isolating the input voltage to be inputted to the portable electronic device before an input voltage exceeding the rated voltage (or known as an over voltage) is inputted, so as to prevent the internal circuit units of the portable electronic device from being damaged by the input voltage exceeding the rated voltage, and protect the internal circuit units of the portable electronic device from being damaged by a misuse of the input voltage.

While the invention has been described by means of specific embodiments, numerous modifications and variations could be made thereto by those skilled in the art without departing from the scope and spirit of the invention set forth in the claims.

What is claimed is:

1. An overvoltage protection circuit, for providing an overvoltage protection when an input voltage exceeds a rated voltage tolerable of an internal circuit unit of a portable electronic device, comprising:
   an input unit, for receiving the input voltage;
   an output unit, for connecting the portable electronic device;
   a voltage limiting unit, coupled to the input unit for receiving the input voltage and restrictively outputting a reference voltage;
   a voltage dividing module, coupled to the input unit, for receiving the input voltage, and dividing the input voltage to produce a partial voltage;
   a comparing module, coupled to the voltage limiting unit and the voltage dividing module, for comparing the reference voltage with the partial voltage, and generating a switch signal according to a comparison result; and
   a switch unit, coupled to the input unit, the output unit and the comparing module, for receiving the switch signal and the input voltage, and the switch signal being used for controlling the input voltage to be outputted to the output unit through the switch unit;
   wherein the comparing module further comprises a first input terminal, a second input terminal, a first control unit and a second control unit, and the first control unit is coupled to the first input terminal, the second input terminal and the second control unit, and the first input terminal is coupled to the voltage limiting unit, and the second input terminal is coupled to the voltage dividing module for inputting the reference voltage and the partial voltage to the first control unit and generating a control signal and outputting the control signal to the second control unit to form the switch signal after the reference voltage and the partial voltage are compared.

2. The overvoltage protection circuit of claim 1, wherein the voltage limiting unit sets a clamping voltage, and if the input voltage is greater than the clamping voltage, the voltage limiting unit outputs the reference voltage which is equal to the clamping voltage, and if the input voltage is not greater than the clamping voltage, the voltage limiting unit outputs the reference voltage which is equal to zero voltage.

3. The overvoltage protection circuit of claim 2, wherein the voltage limiting unit is set to output the reference voltage which is equal to the clamping voltage if the input voltage is greater than the rated voltage.

4. The overvoltage protection circuit of claim 2, wherein the voltage dividing module is set, such that if the input voltage is greater than the rated voltage, the partial voltage has a voltage value smaller than the voltage value of the reference voltage.

5. The overvoltage protection circuit of claim 1, wherein the voltage dividing module further comprises a first resistor and a second resistor, and the first resistor and the second resistor are connected in series with each other, and the input voltage produces the partial voltage at the second resistor.

6. The overvoltage protection circuit of claim 1, wherein the second control unit is a three-terminal device, and one terminal is coupled to the first control unit for receiving the control signal and provided for the other two terminals to define an open-circuit state or a short-circuit state between the two terminals according to the control signal.

7. The overvoltage protection circuit of claim 6, wherein the switch unit is a three-terminal device, and a first terminal is coupled to the comparing module, a second terminal is coupled to the input unit, and a third terminal is coupled to the output unit, and the switch unit controls an open-circuit state or a short-circuit state between the input unit and the output unit according to the switch signal for transmitting the input voltage to the output unit through the switch unit.

8. The overvoltage protection circuit of claim 7, wherein the second control unit and the switch unit are metal oxide semiconductor field effect transistors (MOSFET).

9. The overvoltage protection circuit of claim 8, wherein the voltage limiting unit is a Zener diode.

10. The overvoltage protection circuit of claim 1, further comprising a control interface module installed between the comparing module and the input unit, for controlling the switch unit to selectively output the input voltage to the output unit.

11. A portable electronic device having an overvoltage protection circuit, for receiving an input voltage, comprising:
   an internal circuit unit, installed in the portable electronic device;
   an input unit, for receiving the input voltage;
   an output unit, coupled to the internal circuit unit, for outputting the input voltage to the internal circuit unit;
   a voltage limiting unit, coupled to the input unit, for receiving the input voltage and restrictively outputting a reference voltage;
   a voltage dividing module, coupled to the input unit, for receiving the input voltage, and dividing the input voltage to produce a partial voltage;
   a comparing module, coupled to the voltage limiting unit and the voltage dividing module, for comparing the reference voltage with the partial voltage and generating a switch signal according to a comparison result; and
   a switch unit, coupled to the input unit, the output unit and the comparing module, for receiving the switch signal and the input voltage, and the switch signal being used for controlling outputting the input voltage to the output unit through the switch units;
   wherein the comparing module further comprises a first input terminal, a second input terminal, a first control unit and a second control unit, and the first control unit is coupled to the first input terminal, the second input terminal and the second control unit, and the first input terminal is coupled to the voltage limiting unit, and the second input terminal is coupled to the voltage dividing module for inputting the reference voltage and the partial voltage to the first control unit and generating a control signal and outputting the control signal to the second control unit to form the switch signal after the reference voltage and the partial voltage are compared.

* * * * *